US006243192B1

(12) United States Patent
Mitchell, Jr. et al.

(10) Patent No.: US 6,243,192 B1
(45) Date of Patent: *Jun. 5, 2001

(54) ELECTROCHEMICAL DISPLAY AND TIMING MECHANISM WITH MIGRATING ELECTROLYTE

(75) Inventors: Chauncey T. Mitchell, Jr.; Gerrit L. Verschuur, both of Lakeland, TN (US); Mark A. Shadle; David M. Good, both of Peachtree City, GA (US); Robert Parker, Bend, OR (US)

(73) Assignee: Timer Technologies, LLC, Algoma, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/360,670

(22) Filed: Jul. 26, 1999

Related U.S. Application Data

(63) Continuation-in-part of application No. 09/067,114, filed on Apr. 27, 1998, now Pat. No. 5,930,023.
(60) Provisional application No. 60/045,051, filed on Apr. 28, 1997.

(51) Int. Cl.[7] .......................... G02F 1/153; G01N 27/416; H01M 10/48
(52) U.S. Cl. .......................... 359/270; 324/435; 429/90; 429/8; 359/265
(58) Field of Search .......................... 359/265, 270, 359/272, 274; 429/93, 116, 8, 90; 324/435, 426, 437, 104; 29/623.1

(56) References Cited

U.S. PATENT DOCUMENTS

| | | | |
|---|---|---|---|
| 2,688,649 | 9/1954 | Bjorksten | 136/111 |
| 3,006,980 | 10/1961 | Story | 136/6 |
| 3,045,179 | 7/1962 | Maier | 324/68 |
| 3,209,255 | 9/1965 | Estes et al. | 324/94 |
| 3,230,115 | 1/1966 | Tamminen | 136/111 |
| 3,607,430 | 9/1971 | Glover | 136/111 |
| 3,891,457 | 6/1975 | Auborn | 136/6 |
| 3,940,205 | 2/1976 | Crandall et al. | 350/160 |
| 4,120,568 | 10/1978 | Deb et al. | 350/357 |
| 4,153,345 | 5/1979 | Duchene et al. | 350/363 |
| 4,161,815 | 7/1979 | Land et al. | 29/623 |
| 4,331,386 | 5/1982 | Minami | 350/357 |
| 4,356,818 | 11/1982 | Macias et al. | 128/138 |
| 4,382,700 | 5/1983 | Youngren | 374/102 |
| 4,408,557 | 10/1983 | Bradley et al. | 116/206 |
| 4,418,129 | 11/1983 | Goebel | 429/91 |
| 4,539,275 | 9/1985 | Plasse | 429/152 |
| 4,561,729 | 12/1985 | Heinz et al. | 350/357 |
| 4,614,695 | 9/1986 | Ibbott | 429/127 |
| 4,664,993 | 5/1987 | Sturgis et al. | 429/178 |
| 4,703,754 | 11/1987 | Ibbott | 128/383 |
| 4,804,275 | 2/1989 | Kang et al. | 374/162 |
| 4,876,441 | 10/1989 | Hara et al. | 235/488 |

(List continued on next page.)

FOREIGN PATENT DOCUMENTS 0 638 952   2/1995   (EP) .
WO 93/06474  4/1993  (WO) .

Primary Examiner—Georgia Epps
Assistant Examiner—Evelyn A. Lester
(74) Attorney, Agent, or Firm—Eugene Stephens & Associates; Thomas B. Ryan

(57) ABSTRACT

Printed electrochemical display cells are arranged in layer form with two electrode layers and an electrolyte layer occupying distinct areas of a substrate. When activated, an electrochemical reaction progressively increases the area occupied by the electrolyte layer and progressively decreases the area occupied by the thin-film electrode layer. The thin-film electrode layer recedes at a boundary in common with the electrolyte layer and provides an irreversible indication of change at a rate governed by the electrochemical reaction.

57 Claims, 9 Drawing Sheets

U.S. PATENT DOCUMENTS

| | | | |
|---|---|---|---|
| 4,977,046 | 12/1990 | Bleszinski, Jr. et al. | 429/194 |
| 5,035,965 | 7/1991 | Sangyoki et al. | 429/124 |
| 5,055,968 | 10/1991 | Nishi et al. | 361/395 |
| 5,147,985 | 9/1992 | DuBrucq | 174/260 |
| 5,197,958 | 3/1993 | Howell | 604/361 |
| 5,225,291 | 7/1993 | Rao | 429/51 |
| 5,250,905 | 10/1993 | Kuo et al. | 324/435 |
| 5,264,830 | 11/1993 | Kline et al. | 340/604 |
| 5,339,024 | 8/1994 | Kuo et al. | 324/435 |
| 5,350,645 | 9/1994 | Lake et al. | 429/124 |
| 5,354,289 | 10/1994 | Mitchell et al. | 604/361 |
| 5,396,177 | 3/1995 | Kuo et al. | 324/435 |
| 5,418,086 | 5/1995 | Bailey | 429/93 |
| 5,495,250 | 2/1996 | Ghaem et al. | 342/51 |
| 5,500,759 | 3/1996 | Coleman | 359/270 |
| 5,516,598 | 5/1996 | Visco et al. | 429/42 |
| 5,523,179 | 6/1996 | Chu | 429/104 |
| 5,532,077 | 7/1996 | Chu | 429/102 |
| 5,542,959 | 8/1996 | Tuttle | 29/623.3 |
| 5,563,002 | 10/1996 | Harshe | 429/7 |
| 5,582,623 | 12/1996 | Chu | 524/817 |
| 5,614,586 | 3/1997 | Tang et al. | 524/817 |
| 5,627,472 | 5/1997 | Ofer et al. | 324/435 |
| 5,635,312 | 6/1997 | Yanagisawa et al. | 429/94 |
| 5,637,418 | 6/1997 | Brown et al. | 429/127 |
| 5,652,043 | 7/1997 | Nitzan | 428/209 |
| 5,656,393 | 8/1997 | Boer et al. | 429/217 |
| 5,763,058 | 6/1998 | Isen et al. | 428/209 |
| 5,912,759 | 6/1999 | Good et al. | 359/297 |
| 5,930,023 | 7/1999 | Mitchell, Jr. et al. | 359/270 |

ELECTROCHEMICAL DISPLAY AND TIMING MECHANISM WITH MIGRATING ELECTROLYTE

RELATED APPLICATIONS

This application is a Continuation-In-Part of allowed U.S. patent application Ser. No. 09/067,114, filed Apr. 27, 1998, now U.S. Pat. No. 5,930,023, which claims the benefit of U.S. Provisional Application No. 60/045,051, filed Apr. 28, 1997. Both applications are hereby incorporated by reference.

TECHNICAL FIELD

The invention relates to progressively changing displays including such displays in which the progressive change is used to perform a timing function. In the displays contemplated by the invention, electrochemical reactions produce the progressive change; and these displays are preferably self-powered, irreversible, low cost, and formed in layers that can be printed on an in-line press.

BACKGROUND

Progressively changing displays can be used both to perform timing functions and to display the progress or results of the timing functions. Such displays that are arranged to mark the passage of time are particularly useful as attachments to products with a limited life, such as food, room deodorants, flea collars, roach traps, and other products whose usefulness or effectiveness decreases over time. The progressive changes in these displays can also be equated to the service lives of other products such as batteries or filters, where service life is determined more by usage.

Various mechanisms have been used to effect such progressive changes in displays including physical migration, chemical reactions, and electrochemical reactions. Among the latter are displays that include electrochromic materials and voltaic or electrolytic cells.

For example, U.S. Pat. No. 4,804,275 to Kang et al. discloses a self-powered electrochromic timing device in which a color change boundary in an electrochromic material is advanced by a gradual dissolution of an electrode. Kang et al.'s electrochromic reactions, however, require a strong acid and other materials that add cost and pose problems for both manufacture and use.

U.S. Pat. No. 5,339,024 to Kuo et al. discloses a self-powered charge indicator cell connected in parallel with a main cell. An anode layer carried on a conductive substrate of the indicator cell is gradually oxidized (i.e., eroded) to reveal a message written in ink on an underlying layer. The thickness of the anode layer is tapered or stepped to regulate its rate of disappearance. Another embodiment arranges the anode and cathode layers side-by-side and fashions the electrolyte layer as a porous film straddling both electrode layers. The anode layer erodes under the electrolyte film in a direction away from the cathode layer. Both of Kuo et al.'s embodiments are subject to "islanding", however, where portions of the anode layer become electronically isolated from the cathode layer and prevent the anode layer's more complete disappearance.

U.S. Pat. No. 5,418,086 to Bailey discloses an electrolytic type battery charge indicator powered by the monitored battery. One electrode layer is dissolved and redeposited on another electrode layer as an indication of battery usage. The rate of dissolution and redeposition is controlled by tapering or stepping electrolyte layer thickness between the electrode layers. Like in Kuo et al., the dissolving electrode layer is also subject to islanding, which limits further dissolution of the electrode layer. Another embodiment positions the two electrode layers side-by-side on a common substrate and fills a space between them with electrolyte. The exchanges between electrode layers are expected to grow increasingly irregular with variations in distance between them. Also, the electrolysis operations are at least partially reversible, which can be a problem if more permanent change is desired.

SUMMARY OF INVENTION

We have discovered that thin-film electrodes of electrochemical display cells can be more cleanly eroded for purposes of both measurement and display by linking the erosion of the thin-film electrodes to an expanding boundary of electrolyte. The erosion of the thin film is substantially complete and permanent behind the expanding boundary of electrolyte, and a clear demarcation is provided between the eroded and non-eroded portions of the thin film at the electrolyte boundary. For purposes of this invention and its further description, the term "erode" is regarded as synonymous with the terms "oxidize", "dissolve", "clear", and "disappear" as they pertain to the systematic removal of thin-film electrodes.

According to one expression of our invention, an electrochemical display cell is arranged as a voltaic cell with two electrode layers having different electrode potentials. An electrolyte layer overlaps a first of the electrode layers and has a boundary in contact with a second of the electrode layers for completing an ionically conductive pathway between the two electrode layers. In response to a flow of current between the two electrode layers, the electrolyte boundary moves together with a boundary of the second electrode layer extending the ionically conductive pathway from the first electrode layer. The moving boundary of the second electrode layer provides for changing a visible appearance of the display.

The second electrode layer recedes rapidly at first until the boundary of the electrolyte layer is reached and then the recession slows considerably but continues through the remaining portion of the second electrode layer that was not initially in contact with the electrolyte layer. This surprising result is produced by an accompanying migration of the electrolyte that is apparently drawn along with the receding boundary of the second electrode layer by the interplay of one or more such mechanisms as capillary action, surface tension, diffusion, or electric field effects on ions of the electrolyte layer. More complete clearing of the second electrode layer takes place because erosion is limited to an interface formed by contiguous moving boundaries of the second electrode and electrolyte layers.

The second electrode layer is preferably a thin film capable of undergoing an electrochemical reaction that results in the progressive disappearance of the second electrode layer behind the moving boundary of the electrolyte layer. For example, the second electrode can be made of a thin film of aluminum or zinc deposited onto a transparent substrate, which provides a viewing window for observing the orderly disappearance of the thin film. The transparent substrate is preferably not conductive to avoid interfering with ion migration between the electrode layers across the portion of its surface exposed by the disappearing thin film.

Another expression of our invention features an electrochemical cell that has two electrode layers and an electrolyte layer occupying distinct areas of a substrate. The electrolyte layer is in contact with the two electrode layers for completing an ionically conductive pathway between them. An electronically conductive pathway between the electrode layers supports an electrochemical reaction that progressively increases the area of the substrate occupied by the electrolyte layer and progressively decreases the area of the substrate occupied by one of the electrode layers. The progressively increasing area of the electrolyte layer and the progressively decreasing area of the one electrode layer provide an irreversible indication of change at a rate governed by the electrochemical reaction.

Preferably, the progressively increasing area of the electrolyte layer corresponds to the progressively decreasing area of the one electrode layer. The area of the substrate occupied by the other electrode preferably remains substantially constant throughout the electrochemical reaction.

Though spatially and electronically separated, the first and second electrodes can have an irregular-shaped interface prior to the start of erosion. The irregular-shaped interface, such as a saw-tooth pattern, appears to enhance the electrochemical interaction between the electrode layers. Also, the second electrode layer is preferably funnel-shaped with its wide end adjacent to the first electrode layer to further increase the length of the irregular-shaped interface and to promote the migration of electrolyte in the direction of its advancing boundary. The narrow end of the second electrode layer is elongated to channel the erosion at a faster pace along a predetermined pathway.

The pace of erosion of the second electrode layer can be further influenced in a variety of ways. In addition to adjusting the materials, shapes, and sizes of the electrode layers, the pace of erosion can be influenced by adjusting similar properties of the electrolyte layer, especially the viscosity and ionic conductivity of the electrolyte layer. For example, the electrolyte layer can be made from an electrolytic gel to relatively advance the pace of erosion or from an electrolytic adhesive to relatively retard the pace of erosion. Properties (e.g., resistance) of the electrical connection between electrode layers can also be adjusted to control the pace of erosion. An electronic switch between the electrodes can be used to start, stop, or even restart the erosion of the second electrode, particularly for such purposes as timing continuous or intermittent events.

A printed layer on the substrate can have a window aligned with a limited portion of the length of the second electrode layer for observing movement of an interface between the electrolyte and second electrode layers. Visual images ranging from a patch of color to text or graphics can be progressively revealed behind the second electrode to enhance appearance (such as creating a "fuel gauge" effect) or to provide information related to the progress of the moving interface.

Another expression of our invention as an irreversible electrochemical display includes first and second electrodes interconnected by an electronically conductive pathway. As usual, the second electrode obscures an underlying image. Electrolyte is initially confined within an area out of contact with the second electrode but can be moved through a guided pathway into contact with a limited portion of the second electrode for completing an ionically conductive pathway between the first and second electrodes. The second electrode is progressively erodable along a common boundary with the electrolyte for revealing the underlying image.

The two electrodes preferably have different electrode potentials and together with the flowable electrolyte are supported between two substrates. One of the substrates has a transparent window for viewing the second electrodes. The guided pathway directs the flowable electrolyte along a path of migration in engagement with the second electrode. The progressive erosion of the second electrode along the path of migration produces a change that is viewable through the transparent window.

Yet another expression of our invention as a irreversible electrochemical display also has first and second electrodes interconnectable by both ionically and electronically conductive pathways for supporting an electrochemical reaction that consumes the second electrode. The ionically conductive pathway includes a flowable electrolyte that is initially maintained out of operative contact with an elongated portion of the second electrode. The elongated portion of the second electrode defines a path of migration for the flowable electrolyte. The first electrode also extends along the path of migration. One of the conductive pathways is interruptable for controlling the start of the electrochemical reaction that progressively consumes the second electrode at a common boundary with the flowable electrolyte and produces an irreversible indication of change in the display.

The first electrode can overlap the elongated portion of the second electrode parallel to the path of migration. The electronically conductive pathway is preferably completed between overlapping portions of the first and second electrodes that extend parallel to the path of migration. The flowable electrolyte and the second electrode can also overlap, particularly for such purposes as saving space. However, a barrier is needed to confine operative contact between the elongated portion of the second electrode and the flowable electrolyte to their common boundary along the path of migration.

For purposes of interrupting an ionically conductive pathway between the electrodes, the flowable electrolyte is initially maintained out of contact with at least one of the electrodes as well as with the elongated portion of the second electrode. However, the flowable electrolyte could also be maintained out of contact with both electrodes to avoid premature interactions that could diminish the later performance of the electrolyte as a conveyer of charge, a supporter of oxidation and reduction reactions, or a flowable medium.

Our electrochemical display cell can be constructed as either a voltaic cell, an electrolytic cell, or a hybrid cell containing elements of both. For example, the two electrodes can be made of different conductive materials that generate an electrical potential between them for making a voltaic display cell. The power required to remove the thin metal film is provided by spontaneous redox reactions within the cell. The two electrodes can also be made of the same material (i.e., the material of the thin metal film anode), and an external source of electrical power drives similar redox reactions within the cell. A hybrid display cell can be constructed by sharing electrodes between voltaic and electrolytic portions of a combined cell. The voltaic portion provides the power for removing portions of the thin metal film within the electrolytic portion of the display.

The anode thin metal film is preferably a sputtered or metalized aluminum or zinc that is deposited onto a transparent substrate such as PET (polyethylene terephtalate) or Mylar polyester. Thin films of aluminum or zinc of approximately 30–1000 Angstroms thick can perform sufficiently well as anodes to support their orderly disappearance.

The cathode is preferably a conductive carbon layer printed onto a dielectric layer or substrate or it can be a second metallic thin film such as silver, either of which produces a potential difference with respect to the anode. The cathode can also be made of a manganese dioxide layer printed over a carbon layer that acts as the current collector for carrying current back to the anode along an electronically conductive pathway. One or more layers of carbon or other conductive materials could also be used to function as both a cathode and an electronic conductor between electrodes.

The electrolyte can be in the form of a gel that is held in place by a suitably shaped dielectric spacer; or in a another embodiment, an electrolytic salt, for example, can be mixed into an adhesive, including a pressure-sensitive, UV-curable adhesive or an animal glue. The resulting electrolytic adhesive can act as a binder for the overall structure of the display cell as well as a spacer between the anode and cathode electrode layers.

Our new display cell is well suited for manufacture along an in-line press, especially in label form. All of the layers including the electrodes, the electrolyte, the electronic conductor, the printed images, and an adhesive-backed substrate in label form can be combined from individual webs or printed along the webs. The result is a succession of thin flexible displays that can be manufactured at low cost and integrated with other printable products. Also, the displays consume little power and are irreversible, which are both particularly useful features for such products as service life and elapsed time indicators.

DRAWINGS

DETAILED DESCRIPTION

Figure 1:
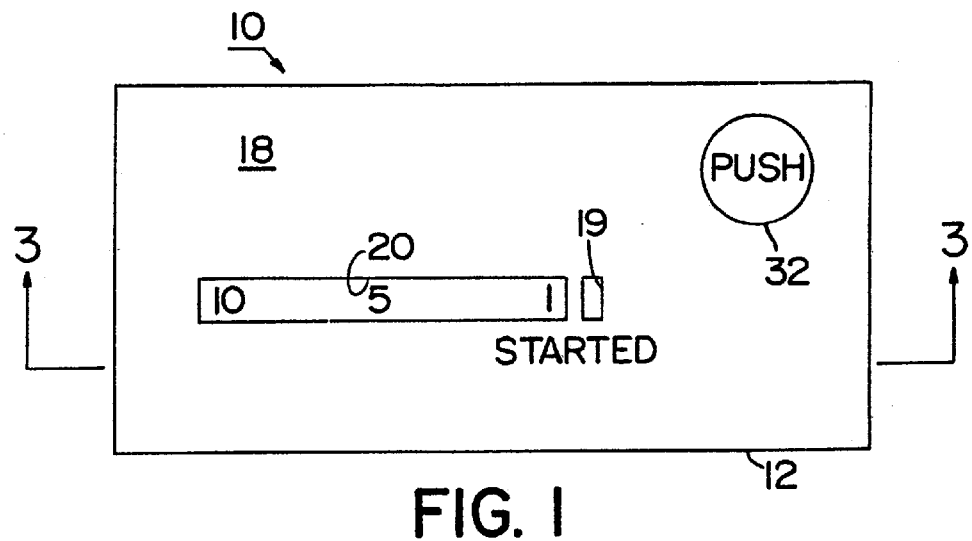
FIG. 1 is a plan view of a voltaic display cell arranged for revealing a systematically changing visual image behind a receding thin-film boundary.
Figure 2A:
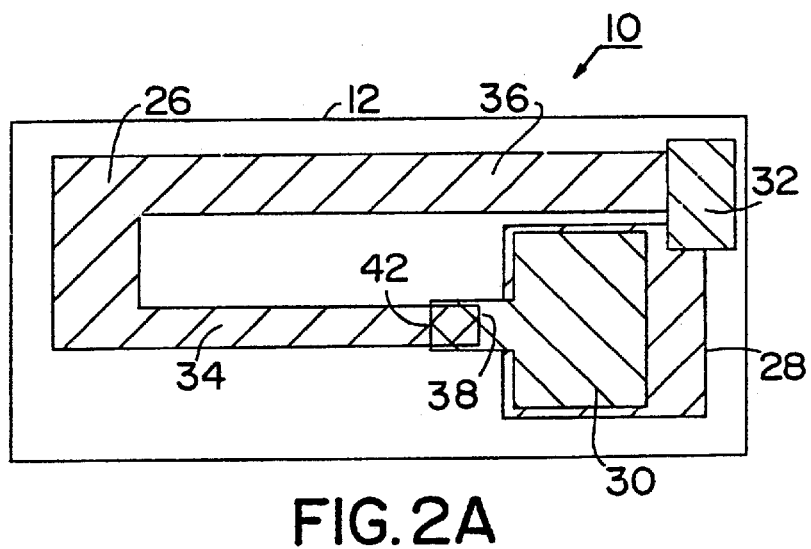
FIG. 2A is a bottom view of the voltaic display cell with a bottom substrate removed to show the active electrochemical components of the cell as they appear prior to activation.
Figure 2B:
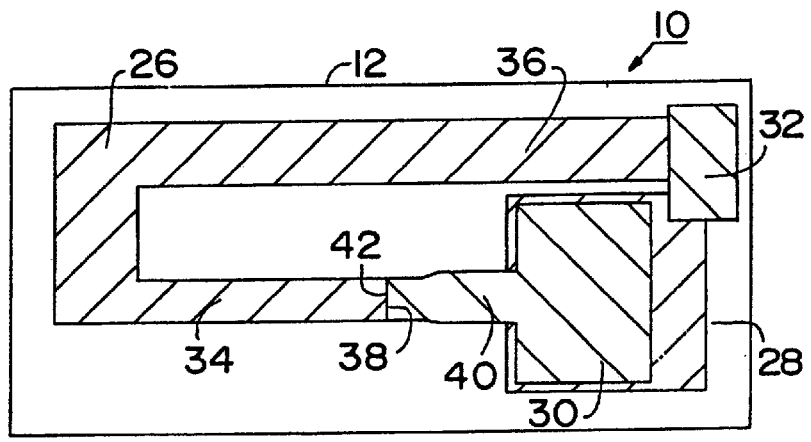
FIG. 2B is a similar bottom view of the cell showing the electrochemical components as they would appear some time after the cell has been activated.
Figure 3:
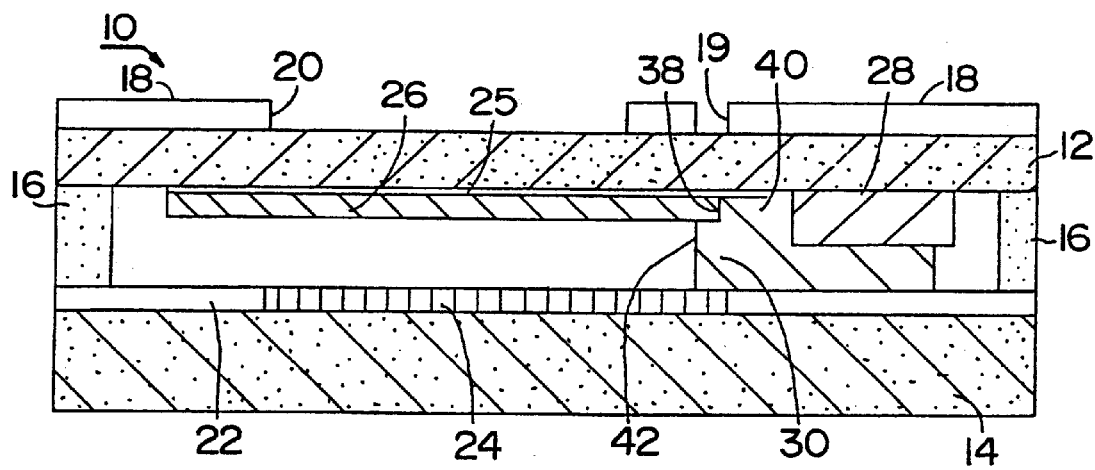
FIG. 3 is a cross-sectional view of the voltaic display cell taken along line 3—3 of FIG. 1.

A voltaic display cell 10 depicted by FIGS. 1–3, which is particularly suited for timing functions, includes top and bottom substrates 12 and 14 bonded together by a dielectric adhesive 16. A graphics layer 18 covers the top substrate 12, which is preferably otherwise transparent, in a pattern that leaves a window 20 for viewing through the top substrate 12. A graphics layer 22 on the bottom substrate 14 includes a visible image 24 that is aligned with the window 20. The visible image 24 can be a pattern of color, text, or graphics.

Sealed between the top and bottom substrates 12 and 14 are two planar electrode layers 26 and 28 interconnected by both an ionically conductive pathway formed by electrolyte layer 30 and an electronically conductive pathway formed by a button switch 32. The button switch 32 opens or closes a complete electrical circuit that extends through both electrode layers 26 and 28 and the electrolyte layer 30. Both substrates 12 and 14 are not conductive to prevent shorting and to avoid interfering with ion migration between the two electrode layers 26 and 28.

The two electrode layers 26 and 28 are made of different materials for generating an electrochemical potential difference. The electrode layer 26 is preferably a thin film of sputtered or vapor-deposited metal, such as aluminum, bonded by its manufacturing technique to a thin Mylar polyester film 25. The electrode layer 28 is a different metal such as manganese dioxide backed by a carbon conductor or a layer of conductive carbon alone, either in a form that can be laid down by printing. A thin film of sputtered or vapor deposited metal, such as silver, could also be used to form the electrode layer 28. Although not shown, a conductive backing for the electrode layer 28, such as printed carbon, can be provided as a current collector if necessary. The electrolyte layer 30, which can also be printed in the form of a paste, gel, or a pressure-sensitive adhesive, can be selected from a wide variety of ionic conductors to support the flow of charge between the electrode layers 26 and 28.

The two electrode layers 26 and 28 and the electrolyte layer 30 occupy distinct areas of the supporting substrates 12 and 14. The electrode layer 26 has a U-shape with separate arms 34 and 36 for facilitating separate ionic and electronic connections to the electrode layer 28. The electrolyte layer 30 is laid down in a pattern that covers most of the electrode layer 28 but only marginally overlaps the arm 34 of the electrode layer 26, just covering its initial boundary 38. The switch 32 electronically interconnects the electrode layer 28 with the other arm 36 of the electrode layer 26. A conductive layer, such as carbon, could be applied to the electrode arm 36 to increase its durability, especially in the region of switch contact.

Figure 4:
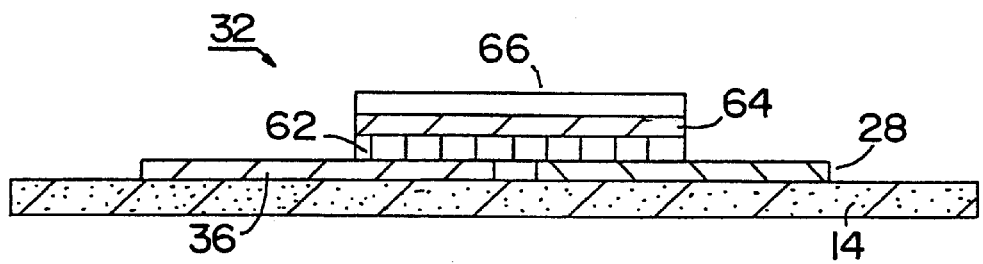
FIG. 4 is a partial cross-sectional view of the same cell showing layers of a switch interconnecting two electrode layers.

A schematic view of the switch 32 is shown in FIG. 4 in which the electronic contact between the electrode arm 36 of the electrode layer 26 and the electrode layer 28 is made by means of a conductive tape 62 laminated onto a strip of thin metallic film 64, such as copper or aluminum, and overlaid by a graphics layer 66 indicating how the user is to place the switch to activate the display cell 10. An example of the conductive tape 62 is 3M product number 9703. The referenced tape 62 is conductive normal to its plane of lamination; and the metallic film 64, which is in contact with the tape 62, carries current parallel through this plane for bridging the gap between the electrode layers 26 and 28.

When the switch 32 is closed, a spontaneous oxidation-reduction reaction (i.e., a redox reaction) takes place within the voltaic display cell 10 resulting in the flow of current between the electrode layers 26 and 28. The movement of charge between the electrode layers 26 and 28 produces erosion of the (thin film) electrode layer 26 starting at its closest boundary 38 in ionic communication with the electrode layer 28. At first, the boundary 38 recedes rapidly through the portion of the electrode layer 26 covered by the electrolyte layer 30 and then slows considerably but continues to recede through the remaining portion of the electrode layer 26 that was not initially covered with the electrolyte layer 30.

Although the mechanism by which the electrolyte layer 30 migrates to continue the recession of the electrode layer 26 is not completely understood, a boundary 42 of the electrolyte layer 30 is apparently drawn along with the receding boundary 38 of the electrode layer 26, thereby maintaining the flow of charge between the electrode layers 26 and 28. More complete clearing of the electrode layer 26 takes place because the erosion is limited to an interface formed by the contiguous moving boundaries 38 and 42 of the electrode layer 26 and the electrolyte layer 30.

By shaping the graphics layer 18 to place a window 19 over the region of initial overlap between the electrolyte 30 and the first electrode 26, an immediate indication that the display has been activated will be obtained when the electrode layer 26 erodes in the area 40 to reveal graphics or color printed on the graphics layer 24. The window 20 in the graphics layer 18 reveals the results of the slower erosion of the remaining portion of the electrode layer 26. The erosion results could also be viewed intermittently by dividing the window 20 into a series of smaller spaced-apart windows, each revealing a separate part of the electrode layer 26.

The further recession of the boundary 38 of the electrode layer 26 together with the corresponding advancement of the boundary 42 of the electrolyte layer 30, which is depicted in FIG. 2B, takes place along the electrode arm 34, which has been narrowed to significantly increase the rate of the boundaries' coincident movements. In addition to the boundaries' common width, the amount of charge flowing across the boundaries 38 and 42 also affects the common rate of the boundaries' movements. Factors relating to the amount of charge flowing across the boundaries 38 and 42 include the areas of the two electrode layers 26 and 28, the amount and makeup of the electrolyte layer 30, the resistance of the electronically conductive pathway (e.g., the switch 32), and the thickness of the electrode layer 26. Also, the common rate of the boundaries' movements is inversely related to the spacing between the common portions of the boundaries 38 and 42 and the electrode layer 28, which corresponds to the path length of ion migration between the electrode layers 26 and 28. Accordingly, the pace of the boundaries' movements slows with time as both the area of the electrode layer 26 decreases and the spacing between the electrode layers 26 and 28 increases.

Preferably, the thin film is less than 500 Angstroms thick. However, the thin film should be thick enough to block a view of the visual image 24 through the window 20. Uniformity of the thin film is also important to avoid irregular erosion that could leave islands that are electronically isolated from the remaining portions of the electrode 26.

The electrolyte 30 is preferably an electrolytic adhesive to retain its desired pattern without further confinement and to bond the two substrates 12 and 14 together. For example, U.S. Pat. No. 5,614,586 to Tang et al., which is hereby incorporated by reference, discloses a hydrogel adhesive suitable for conveying charge between the two electrodes 26 and 28.

Figure 5:
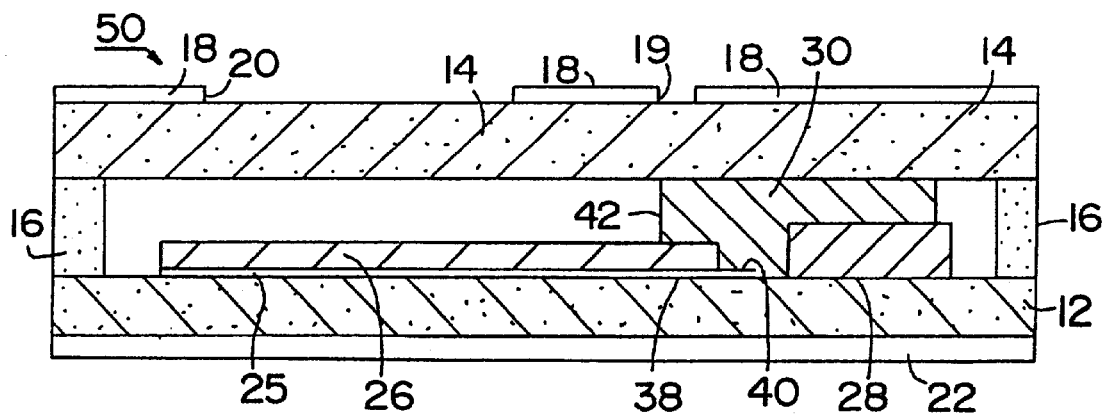
FIG. 5 is a cross-sectional view of a similar voltaic display cell modified to depict an alternative viewing option having an opposite line of sight through the display.

FIG. 5 depicts an alternative embodiment to the display cell 10 in which the structure of the new display cell 50 is essentially inverted between the outer layers 12 and 14. Similar reference numerals call out similar elements of the cells 10 and 50 to more clearly contrast the reordering among the elements. In both embodiments 10 and 50, the receding boundary 38 of the eroding electrode layer 26 is viewed through the window 20.

Instead of patterning the electrode layer 26, the thin film of the electrode layer 26 together with its film backing 25 could be enlarged and substituted for one of the substrates 12 or 14. A patterned dielectric coating could be applied to isolate the non-functional areas of the thin film from electrical contact with other active components of the display cell 10. The total area of the thin-film electrode layer 26 would increase sharply, but its area in contact with the electrolyte layer 30 would remain the same. Care should be taken to pattern the electrolyte layer 30 within the exposed area of the thin film to avoid creating pathways for ion conduction to the other electrode layer 28 circumventing the intended boundary 38 of the thin film. Also, either the thin-film electrode or the dielectric coating could be patterned, together with the electrolyte, to provide more than one boundary for erosion (e.g., additional electrode arms) or to provide electrode arms with nonlinear shapes.

The display cell 10 can be used for a variety of purposes as a stand-alone device or as a display component of another device. For example, the display cell 10 can be used as a game piece, a message card, an elapsed time indicator, or as an indicator related to some internal or external condition. Layers of adhesive and release can also be added to the substrates to incorporate the displays into pressure-sensitive labels or other printable products. The receding boundary 38 can also be used as a gauge equating some ongoing condition to the flow of charge through the cell. The rate of erosion can be further controlled by regulating the current that is allowed to flow through the self-powered display cell. This can be done by placing an optional printed resistor (not shown) of known resistance in the circuit of this or any of the other display cells described here.

Figure 6:
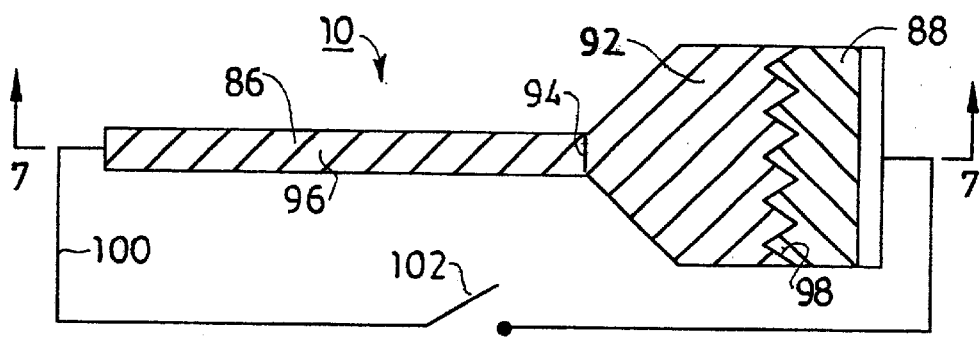
FIG. 6 is a top view of two electrode components of an alternative display cell shaped to enhance boundary erosion of one of the electrodes.
Figure 7:
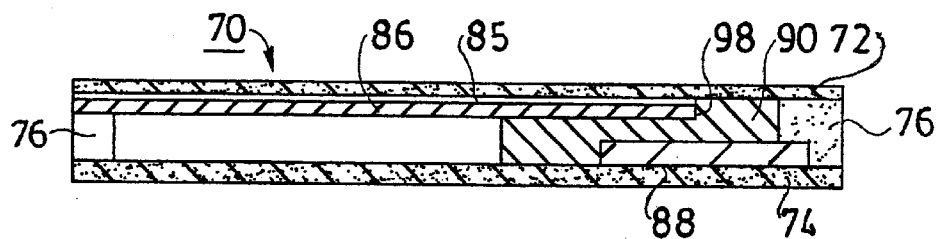
FIG. 7 is a cross-sectional view showing additional layers of the alternative display cell and taken along line 7—7 of FIG. 6.

FIGS. 6 and 7 illustrate an alternative display cell 70, which is made of similar materials and is useful for similar purposes but is specially configured to aid the migration of electrolyte. Top and bottom substrates 72 and 74 are peripherally bonded by a dielectric adhesive 76 and seal between them the active components of an electrochemical cell. A thin-film electrode layer 86 is mounted on the substrate 72 through the intermediacy of a clear film backing 85, and another electrode layer 88 is mounted on the substrate 74. The two electrode layers 86 and 88 preferably have different electrode potentials, but an electrical potential could also be imposed across them by a separate source of electrical current. In the cell shown, an electrical conductor 100 and a switch 102 complete an electronically conductive pathway between the electrode layers 86 and 88.

An electrolyte layer 90 overlaps most of the electrode layer 88 and a first portion 92 of the electrode layer 86 for completing an ionically conductive pathway between the electrode layers 86 and 88. A boundary 94 of the electrolyte layer 90 separates the first portion 92 of the electrode layer 86 from a second portion 96 that is not overlapped by the electrolyte layer 90. The first portion 92 of the electrode layer 86 is funnel-shaped with a wide end 98 cut in a saw-tooth pattern. The electrolyte layer 90 matches the funnel shape of the electrode layer 86 and overlaps the saw-tooth interface with the electrode layer 88.

Both the irregular shape and the width of the end 98 of the electrode layer 86 increase the length of "shoreline" (i.e., lateral interface) between the electrode layers 86 and 88. This appears to allow an enhanced flow of charge between the two electrode layers 86 and 88. After erosion of the first portion 92 of the electrode layer 86 from its thin-film backing 85, the remaining funnel shapes of the backing 85 and the electrolyte layer 90 appear to enhance the migration of the electrolyte layer 90 toward its common boundary 94 with the remaining second portion 96 of the electrode layer 86. Further electrolyte migration and electrode erosion take place along the common boundary 94 at a pace that is further enhanced by the narrow width of the second portion 96 of the electrode layer 86.

Graphic layers, which are not shown, can be added to the various substrates similar to the previously described display cells. An adhesive backing and release layers can also be added for incorporating the display cells into labels or other packaging structures.

Figure 8:
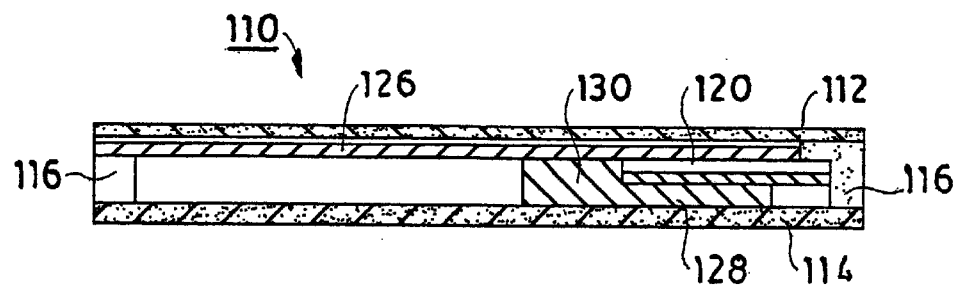
FIG. 8 is a cross-sectional view of a display cell similar to the display cell in FIGS. 6 and 7 but having active layers arranged in a different order.

Another display cell 110 having a similar funnel-shaped electrode configuration is shown in FIG. 8. Again, two substrates 112 and 114 and a dielectric adhesive 116 enclose the active components of the cell. However, both electrode layers 126 and 128 are mounted on the same substrate 112 and separated by a dielectric layer 120 that electronically isolates the two electrode layers 126 and 128. An electrolyte layer 130 overlaps portions of both of the electrode layers 126 and 128. The electrode layer 128 preferably includes a saw-tooth pattern to increase the length of its lateral interface with the electrode layer 126. Though not shown, the two electrode layers 126 and 128 could be laid out entirely side-by-side on the same substrate with a mating saw-tooth or other complementary shaped interface.

Alternatively, the electrode layers 126 and 128 could be laid out in an arrangement where the electrode layer 128 overlaps the portion of the electrode layer 126 that is subject to systematic erosion. A receding boundary of the electrode layer 126 and an advancing boundary of the electrolyte layer 130 would move together within a space between the dielectric layer 120 and the underlying transparent support for the thin film of the electrode layer 126. A graphics layer could be added within a space between the two electrode layers 128 and 128, preferably between the dielectric layer 130 and the electrode layer 128, to provide a visual image that is gradually revealed by the systematic erosion of the electrode layer 126.

Figure 9:
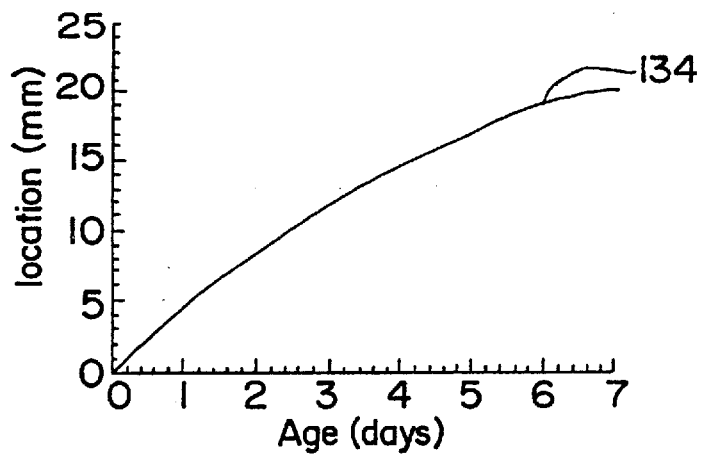
FIG. 9 is a graph relating distance of recession to the passage of time for display cells similar to those of FIGS. 6 and 7.

A graph in FIG. 9 plots the recession of a common electrode-electrolyte boundary against time for a display cell similar to those described above. A curve 134 constructed from exemplary data points follows a power law shape. A combination of factors may be responsible for a slowing of the pace of boundary migration with time, but at least one of these factors is expected to relate to an increasing internal resistance of the cells. Exhaustion of the supply of electrolyte is also expected to limit its range of migration. A large reservoir of electrolyte in contact with the stationary electrode can be used to extend the range of migration.

Figure 10:
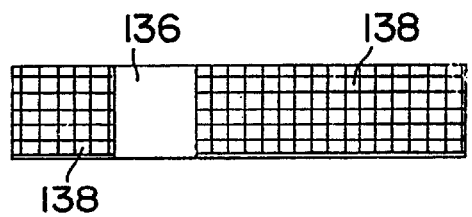
FIG. 10 shows an alternative window for viewing a segment of the receding electrode.

FIG. 10 shows an alternative window 136 in a top substrate (e.g., 12, 72, or 112) of one of the previous display cells, where most of the length of the erodable electrode (26, 86, or 126) is covered by masking 138 except for the window 136. Accordingly, much of the boundary migration remains unseen until the boundary (e.g., 38 or 98) recedes into a region visible through the window 136. The location of the window 136 can be used to provide a timing function or other form of indication related to the cumulative amount of charge passing through the cells.

Figure 11:
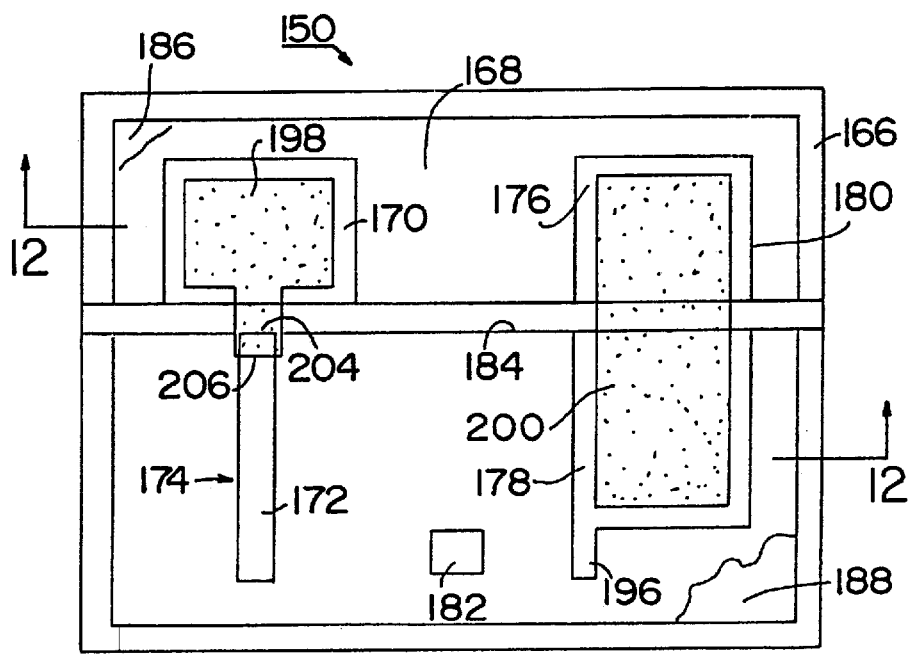
FIG. 11 is a partly broken away bottom view of a hybrid display cell with a bottom layer removed to show features of a voltaic power cell combined with an electrolytic display cell.
Figure 12:
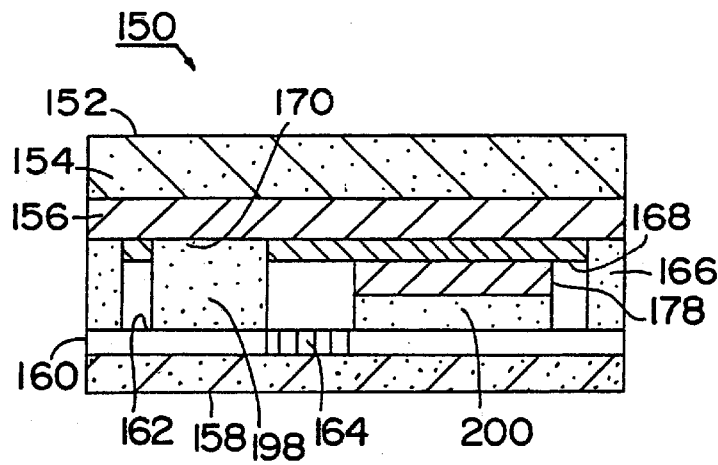
FIG. 12 is a cross-sectional view of the hybrid display cell taken along line 12—12 in FIG. 11.

A hybrid display cell 150 depicted in FIGS. 11 and 12 combines features from both voltaic and electrolytic cells. A top substrate 152 is a transparent film 154 covered by a layer of thin metal film 156 (again, preferably sputtered aluminum). A bottom substrate 158 is a print medium 160 covered by a graphics layer 162. A portion of the graphics layer 162 includes a visible image 164, which can be nothing more than a pattern of color to provide contrast or can be specific text or graphics. A dielectric adhesive 166 bonds peripheries of the top and bottom substrates 152 and 158.

Another dielectric 168 (preferably in the form of a varnish) covers portions of the thin film 156 defining, within separately exposed areas of the thin film 156, two electrodes 170 and 172 of an electrolytic cell 174 and one electrode 176 of a voltaic cell 180, as well as a switch contact 182. A second electrode 178 of the voltaic cell 180 is printed over a portion of the dielectric 168. The second electrode 178 is a different material, such as manganese dioxide, for providing an electrochemical potential difference with the electrode 176. A collector beneath the electrode 178 is preferred but not shown.

A gap 184 divides the thin film 156 into two portions 186 and 188 for electronically isolating the two electrodes 170 and 172 of the electrolytic cell 174 and the two electrodes 176 and 178 of the voltaic cell 180. Remaining areas of the two portions 186 and 188, which are covered by the dielectric 168, provide conductive pathways between the two cells 174 and 180. The remaining area of thin-film portion 186 connects the electrodes 170 and 176 directly. However, the conductive pathway between the electrodes 172 and 178 provided by the remaining area of the thin-film portion 188 is interrupted by a switch (not shown), which spans the contact 182 of the thin-film portion 188 and a contact 196 of the electrode 178.

Separate electrolyte patterns 198 and 200 span the electrodes 170 and 172 of the electrolytic cell 174 and the electrodes 176 and 178 of the voltaic cell 180. The electrolyte pattern 198 overlaps a large portion of the electrode 170 but contacts only a small portion of the narrower electrode 172 along which electrolyte migration is supported.

Closing the switch between the contacts 182 and 196 completes a circuit between the two cells 174 and 180. Spontaneous redox reactions in the voltaic cell 180 create a potential difference across the two portions 186 and 188 of the thin metal film 156, which induces other redox reactions in the electrolytic cell 174. Accompanying the flow of charge through the electrolytic cell 174, a boundary 204 of the electrode 172 quickly recedes until it meets a boundary 206 of the electrolyte; and thereafter, the two boundaries 204 and 206 move together at a slower pace through an increasing distance from the electrode 170. More irregular erosion can also occur in the electrode 176 of the voltaic cell 180. However, the electrode 176 is sized so that the visual image 164 is revealed before the voltaic cell 180 expires.

Except for the disappearing electrode 172, the other two electrodes 170 and 176 that are exposed by the dielectric 168 can be overprinted with conductive materials including the same material as the thin film 156 (e.g., aluminum) to limit their erosion or to enhance their electrochemical properties. The electrode 176, for example, can be entirely overprinted with another electrode material, such as zinc, to provide more energy for powering the redox reactions of the electrolytic cell 174.

The electrolytic cell portion 174 of the hybrid display cell 150 could also be modified to erode more than one area of the electrode 172. The two electrodes 176 and 178 could also be stacked together in a more conventional form, since neither electrode 176 and 178 is eroded for display purposes. Similar benefits to those obtained from this hybrid display cell 150 can be obtained from compound voltaic cells. Two separate electrolyte layers bridge electrode layers with different electrode potentials. A first of the electrolyte layers provides the intended pathway for systematic erosion of one of the electrode layers, and a second of the electrolyte layers separately bridges the two electrode layers to provide a more constant source of power as the migration proceeds. At least three separate electrodes are preferred, only one of which is a thin film subject to rapid disappearance. Both of the electrode portions bridged by the second electrolyte layer are preferably more robust.

Figure 13:
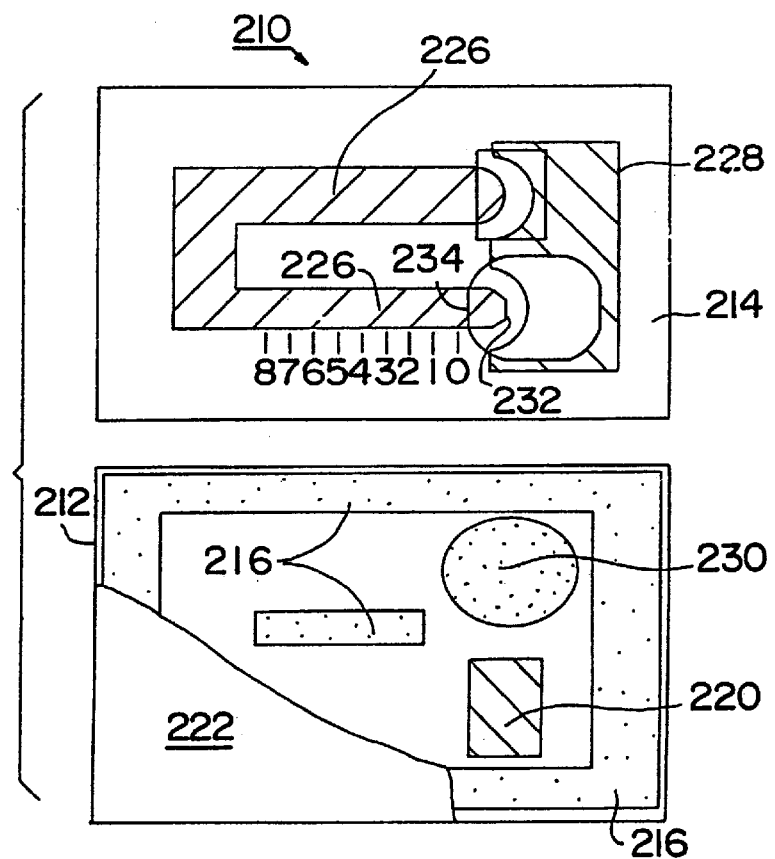
FIG. 13 shows two halves of a deferred assembly display cell having active components divided between two substrates to prolong shelf life prior to use.

FIG. 13 illustrates another simple voltaic display cell 210 with similar features but modified for deferred assembly to extend shelf life of the cells by reducing possibilities for self-discharge until the cell is actually put into use (i.e., activated). Of the active electrochemical components, two electrode layers 226 and 228 are mounted (e.g., printed) on a bottom substrate 214, and an electronically conductive layer 220 and an electrolyte layer 230 are mounted (e.g., printed) on a top substrate 212. A dielectric adhesive layer 216 is also mounted (e.g., printed) on the top substrate 212 for eventually bonding the two substrates 212 and 214 together. A release liner 222, which is shown in a broken-away view to reveal underlying layers, covers and protects the electronically conductive layer 220, the electrolyte layer 230, and the dielectric adhesive layer 216 until ready for further assembly.

The two substrates 212 and 214 along with their accompanying layers can be stored in this condition with less risk of self-discharge for an extended period of time. When ready for use, the release liner 222 is peeled away, and the top and bottom substrates 212 and 214 are folded together so that the electronically conductive layer 220 and the electrolyte layer 230 operatively interconnect separate portions of the two electrode layers 226 and 228. The completed electronic and ionic pathways between the electrode layers 226 and 228 support an electrochemical reaction that erodes a boundary 232 of the electrode layer 226 up to a boundary 234 of the electrolyte layer 230 at a relatively fast pace; and thereafter, the boundaries 232 and 234 move together for eroding remaining portions of the electrode layer 226 at a slower pace.

Instead of printing the electrically conductive layer 222 on the top substrate 212, the two electrode layers 226 and 228 could be permanently electronically interconnected on the bottom substrate 214. Only the electrolyte layer 230 needs to remain out of contact with at least one of the electrodes 226 and 228 (preferably the thin-film electrode 226) to reduce the risk of self-discharge. Alternatively, the electronically conductive layer 220 could be replaced by a switch, which can be closed some time after assembly to further control the activation of the display cell 210.

Figure 14:
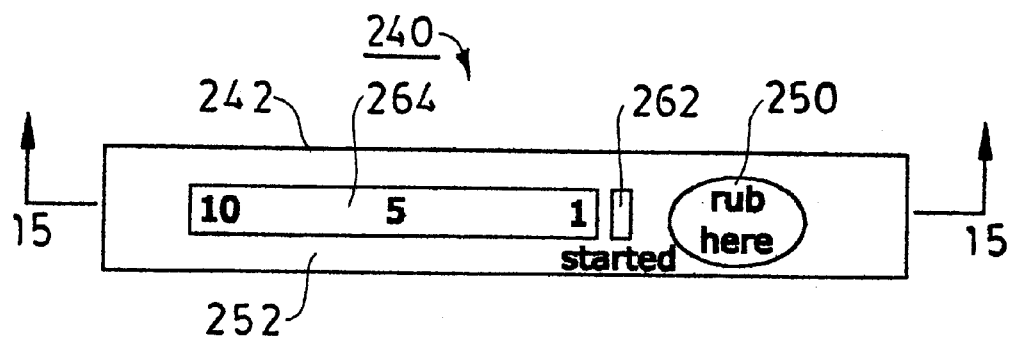
FIG. 14 is a plan view of a display cell similar to those of FIGS. 1–8 but arranged for deferred activation by temporarily isolating the electrolyte layer from one of the electrode layers.
Figure 15:
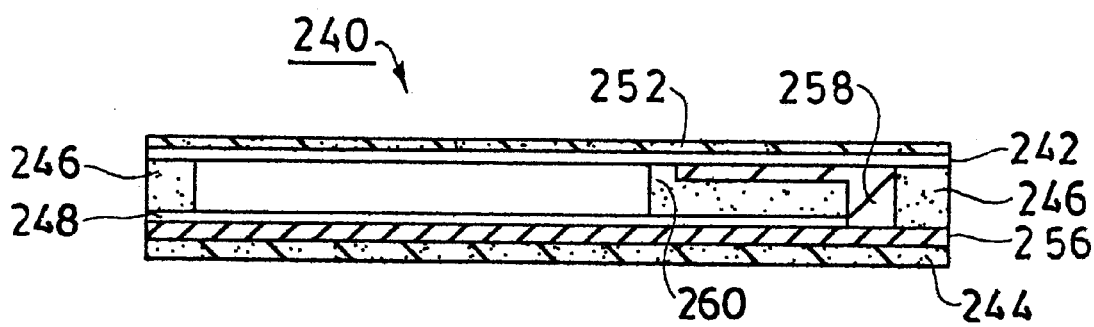
FIG. 15 is a cross-section of the deferred activation display cell taken along line 15—15 of FIG. 14.

FIGS. 14 and 15 illustrate a display cell 240, which is also expected to enjoy an extended shelf life by interrupting an electrolytic connection between two electrode layers 256 and 258. Similar to earlier embodiments, the two electrode layers are sealed between top and bottom substrates 242 and 244 that are bonded together by a dielectric adhesive layer 246. However, contrary to the earlier embodiments, the two electrode layers 256 and 258 are mounted in direct contact with each other forming a permanent electronic connection between them. An electrolyte layer 260 directly contacts the electrode layer 258 but is initially isolated from the electrode layer 256 by a passivation layer 248 containing a fragile dielectric material that prevents the electrolyte layer 260 from coming into contact with electrode layer 256 until a user wishes to activate the cell. Activation is accomplished as directed at a spot 250 of a graphics layer 252 by aggressive rubbing that breaks some of the fragile structure of the passivation layer 248 allowing the electrolyte layer 260 to penetrate the passivation layer 248 and contact the electrode layer 256. A window 262 in the graphics layer 252 reveals that the display cell 240 has been activated, and subsequent erosion of the electrode layer 256 becomes visible through another window 264 to reveal a color bar or a series of numbers (in this illustration) or other graphics.

Activation can also be deferred by pacifying the electrolyte layer itself. For example, the electrolyte layer 260 can be arranged in direct contact with both of the electrode layers 256 and 258 but stored at temperatures below freezing, which can reduce the electrolytic action to near zero. Only when the electrolyte is thawed will the display cell 240 begin to activate. Such a display cell could be used to record and display an amount of time that a product has been exposed to temperatures above freezing.

Figure 16:
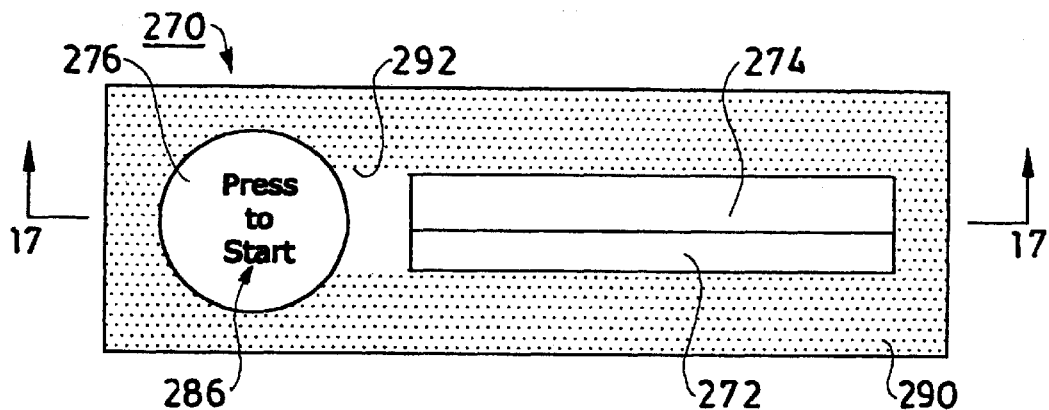
FIG. 16 is a plan view of a display cell with parallel electrodes and a separate pocket of electrolyte that can be squeezed into contact with the parallel electrodes for activating the display.
Figure 17:
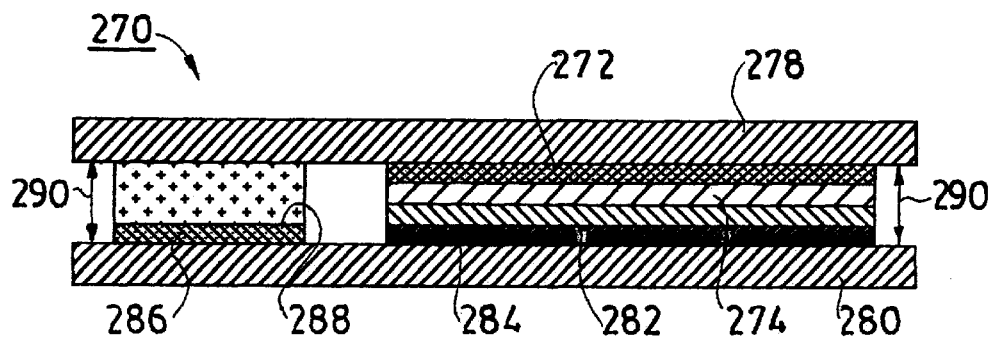
FIG. 17 is a cross-sectional view of the display cell of FIG. 17 taken along line 17—17 of FIG. 16.
Figure 18:
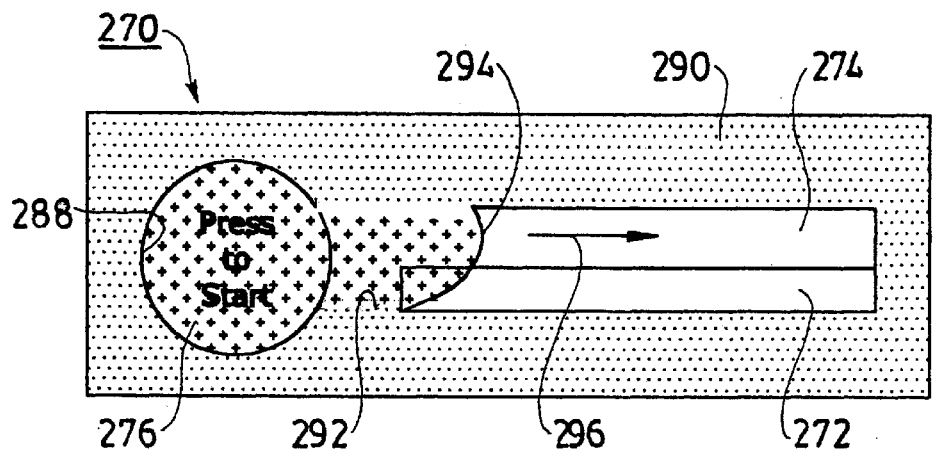
FIG. 18 is another plan view of the display cell of FIGS. 16 and 17 showing an advancing common boundary between the electrolyte and one of the electrodes.

FIGS. 16–18 depict another irreversible electrochemical display 270 in which an ionically conductive pathway is interrupted between electrodes 272 and 274 for controlling activation of the display 270. The two electrodes 272 and 274 along with a flowable electrolyte 276 are supported between top and bottom substrates 278 and 280. The electrode 272, which functions as a cathode, is preferably made from carbon applied to the top substrate 278. The electrode 274, which functions as an anode, is preferably made from zinc that is deposited onto its own median substrate 282. The two electrodes 272 and 274 overlap along their common length to complete an electronically conductive pathway between them. The top substrate 278 is preferably transparent or includes a window for viewing the electrode 274. A graphic 284 underlies the electrode 274 on the bottom substrate 280.

In place of the graphic 284, either of the underlying substrates 280 or 282 could provide a display image such as a contrasting color or another more complex pattern. The electrode 274 could be deposited or otherwise supported directly on the bottom substrate 282. Either or both of the top and bottom substrates 278 and 280 could be formed as laminations for such purposes as providing color patterns, further rigidity, or better sealing capabilities. For example, the top and bottom substrates 278 and 280 can be formed by a combination of low density polyethylene (LDPE), high density polyethylene (HDPE), and polyethylene terephtalate (PET). The bottom substrate 280 could be metalized to form a stronger barrier.

A graphic 286 underlies the flowable electrolyte 276, which is preferably transparent to reveal instructions printed within the graphic 286. For example, the message "press to start" is printed within the graphic 286 to instruct users on a simple procedure for activating the display 270. Initially, the flowable electrolyte 276 is confined within an area 288 overlapping the graphic 286 between the top and bottom substrates 278 and 280. A heat seal 290 (shown as a pattern of dots in FIGS. 16 and 18 and as arrows in FIG. 17) between the two substrates 278 and 280 surrounds the two electrodes 272 and 274, and initially confines the flowable electrolyte 276 within the area 288. The actual layers of our display 270 are much thinner than those shown in FIG. 17, and the top and bottom substrates 278 and 280 preferably touch each other to form the heat seal 290. Also, the flowable electrolyte 276 preferably forms a bulge in the top substrate 278 in the form of a bump or knob that can be depressed for forcing the electrolyte from the confinement area 288.

A guided pathway 292 within the heat seal 290 provides a channel for guiding the flowable electrolyte 276 under force of pressure from the confinement area 288 into contact with the two electrodes 272 and 274. Pressing on the top substrate 278 over the confinement area 288 forces the flowable electrolyte 276 through the guided pathway 292 into contact with the two electrodes 272 and 274. Upon reaching the two electrodes 272 and 274, an ionically conductive pathway is completed between the electrodes triggering a spontaneous electrochemical reaction that clears any underlying portion of the electrode 274.

Similar to the other embodiments, a common boundary 294 is formed between the flowable electrolyte 276 and the remaining portion of the electrode 274. As the electrochemical reaction continues, the common boundary 294 is advanced along a path of migration 296 for the flowable electrolyte 276, which progressively reveals the underlying graphic 284 through the top and median substrates 278 and 282. The clearing rate of the electrode 274 provides a timing function that can be incorporated into the display 270. Instead of viewing the entire course of the electrode erosion, only an end point or predetermined interim points along the graphic 284 could be made available for viewing.

Figure 19:
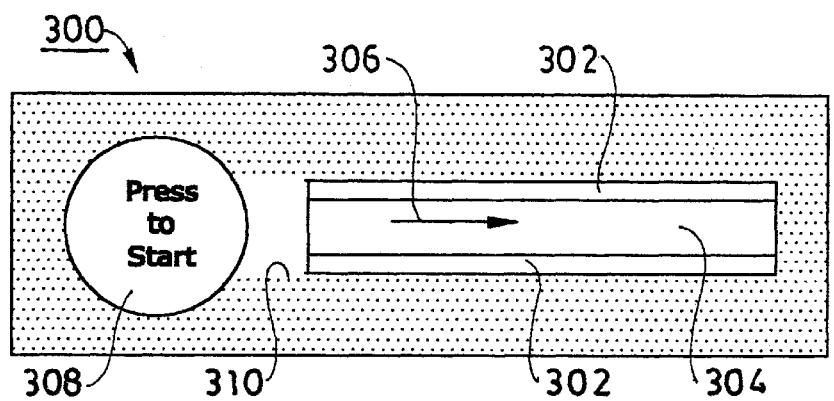
FIG. 19 is a similar display with a pair of parallel cathode electrodes overlapping an erodable anode electrode.
Figure 20:
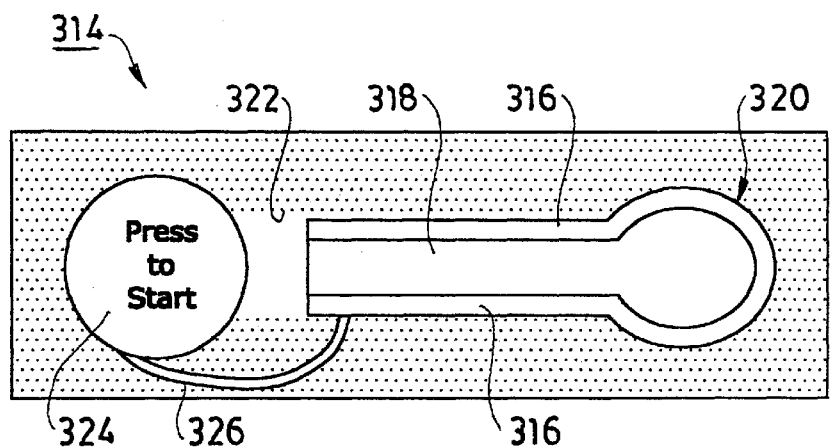
FIG. 20 is a similar display in which a pair of overlapping cathode electrodes outline a bulb shape at a remote end of an anode electrode.
Figure 21:
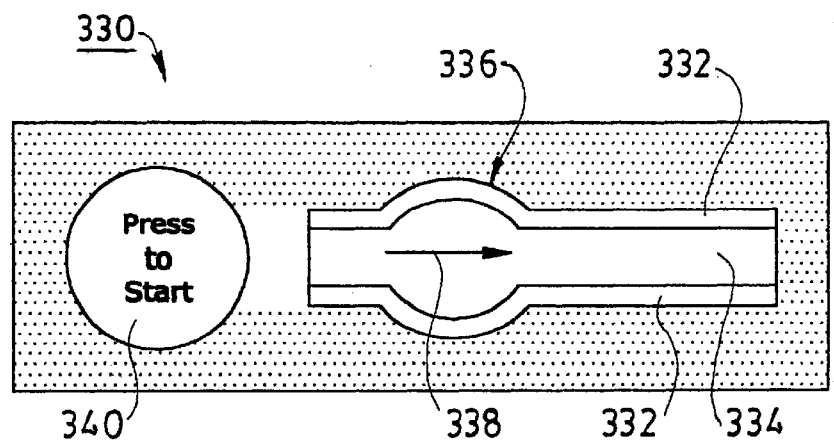
FIG. 21 is a similar display in which a pair of overlapping cathode electrodes outline a bulge shape midway along a length of an anode electrode.

FIGS. 19–21 illustrate three similar irreversible displays 300, 314, and 330 with different plans. For example, the display 300 of FIG. 19 is similar to the display 270 except that a cathode electrode 302 is laid out in parallel tracks that overlap an anode electrode 304 along an intended path of migration 306 for a flowable electrolyte 308. Face-to-face electrical contact is made between the electrodes 302 and 304. The display is activated by forcing the flowable electrolyte 308 along a guided pathway 310 into contact with the electrodes 302 and 304.

Display 314 of FIG. 20 also includes overlapping cathode and anode electrodes 316 and 318. Matching a periphery of the anode electrode 318, the cathode electrode 316 traces a bulb 320 that provides an enlarged interior clearing area for the anode electrode 318 to reveal an underlying graphic image (not shown). In addition to a guided pathway 322 for directing a flowable electrolyte 324 to the electrodes 316 and 318, an alternate channel 326 performs a pressure balancing function to reduce resistance to flow of the electrolyte 324 through the guided pathway 322.

Display 330 of FIG. 21 is similar to the display 314 of FIG. 20 with overlapping cathode and anode electrodes 332 and 334. The cathode electrode 332 traces a periphery of the anode electrode 334 forming a bulb 336 at mid length along a path of migration 338 for a flowable electrolyte 340. The enlarged bulb 336 provides an enlarged area for viewing an underlying graphic (not shown) following a progressive erosion of the anode electrode 334. Also, a pace of erosion at a common boundary (not shown) between the flowable electrolyte 340 and the anode electrode 334 can be influenced by a length of the common boundary at which the electrode 334 is consumed.

Additional flowable electrolyte could be stored beneath the cathode and anode electrodes 332 and 334 of this or other of the embodiments disclosed herein to minimize surface dimensions of the displays. The cathode electrode 332 of this or other embodiments could be continuous or discontinuous along the path of migration so long as complete electronic and ionic connections are maintained between the electrodes.

Figure 22:
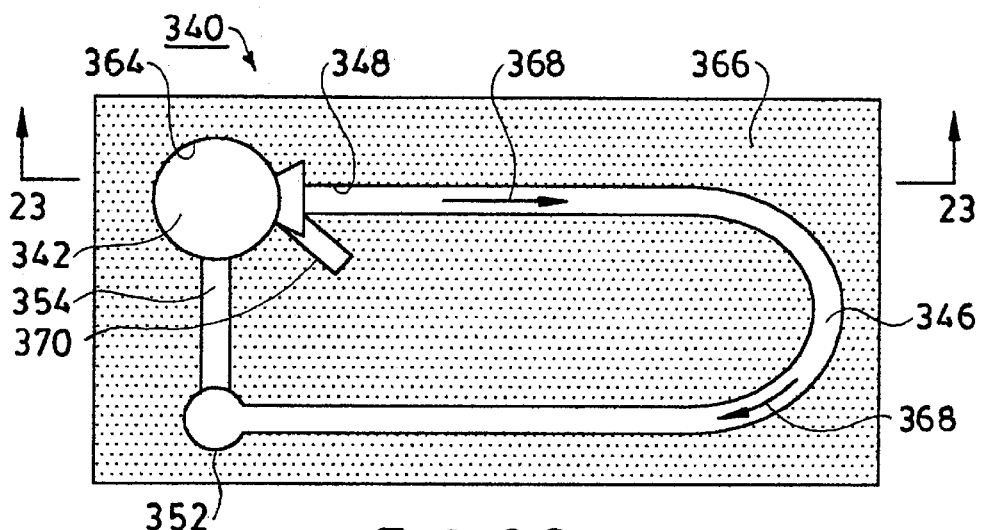
FIG. 22 is a plan view of a display cell having a U-shaped anode electrode ionically connectable to a cathode at one end and electronically connected to the cathode electrode at the other end.
Figure 23:
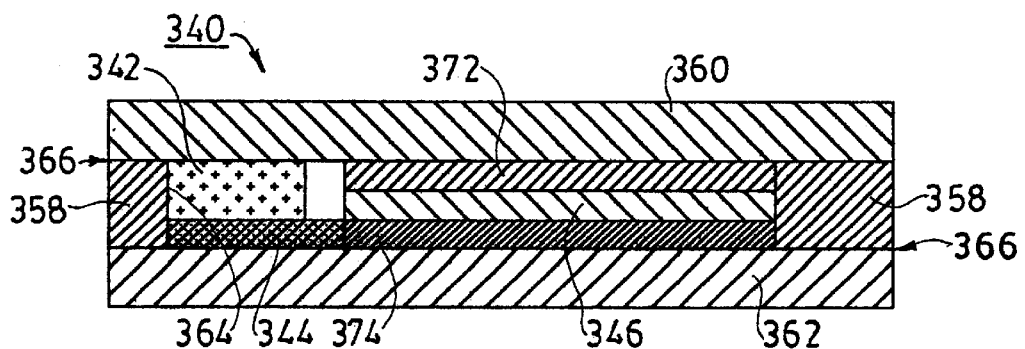
FIG. 23 is a cross-sectional view taken along line 23—23 of FIG. 22.

Another irreversible display 340 activated by movement of a flowable electrolyte 342 but having much more limited overlap between cathode and anode electrodes 344 and 346 is depicted by FIGS. 22 and 23. Also in contrast to the immediately preceding embodiments, the flowable electrolyte 342 is initially confined in contact with the cathode electrode 344. A guided pathway 348 directs the flowable electrolyte 342 into contact with the anode electrode 346 for initiating an electrochemical reaction that progressively erodes the anode electrode 346 at a common boundary (not shown) with the flowable electrolyte 342. Only a far end 352 of the anode electrode 346 overlaps with an extension 354 of the cathode electrode 344 to complete an electronic interconnection between the two electrodes 344 and 346.

A spacer substrate 358 separates top and bottom substrates 35 360 and 362 and includes a recess 364 within which the flowable electrolyte 342 is initially confined. A heat seal 366 is preferably used to bond all three substrates 358, 360, and 362 together, leaving the guided pathway 348, which extends along the anode electrode 346 to provide a path of migration 368 for the flowable electrolyte 342. An alternate channel 370 is formed through the spacer substrate 358 to accommodate overflows of the electrolyte 342. A median substrate 372 supports the anode electrode 346, and a graphic 374 underlies the length of the anode electrode 346 to progressively mark progress of the common boundary (not shown) with the flowable electrolyte 342.

The guided pathway 348 in this as well as in the preceding embodiments is constructed and sized to support migration of the flowable electrolyte 342 behind a common boundary (not shown) with the erodable electrode 346. For example, dimensions of the pathway should be minimized to reduce the amount of flowable electrolyte 342 needed to migrate through a required distance. Although the graphic 374 is shown separating the anode electrode 346 from the bottom substrate 362, some inks containing oxidizing agents can prematurely corrode the anode electrode 346 and interfere with the ordered erosion of the anode electrode. Accordingly, the spacer 358 or another layer can be interposed between the graphic and the anode electrode 346 to provide the bottom of the guided pathway 348. Similar pockets of additional flowable electrolyte could be provided along the guided pathway 348 of this or other preceding embodiments to replenish the supply of electrolyte available for further migration.

The viscosity and yield value of the flowable electrolyte 342 in this and the preceding embodiments can be adjusted to prevent leakage of electrolyte from its initial confines until the display 340 is activated. The heat seal 366 or other sealing structure can be used together with the top and bottom substrates 360 and 362 to minimize evaporation or other loss of the flowable electrolyte 342 to the surrounding environment as well as to isolate the flowable electrolyte from other active components of the display. When functioning as an ionic switch, force is preferably required to move the electrolyte from its initial confines along the guided pathway 348 into engagement with at least the anode electrode 346. However, resistance to flow should be limited to permit a slow migration of the electrolyte for extended periods.

Several functions are supported by the electrolyte, namely, oxidation in connection with the anode, reduction in connection with the cathode, ionic charge transfer between the anode and cathode, and migration following the receding boundary of the anode. More than one electrolyte can be used in combination to support all of these functions. A single electrolyte can also be formed with both stationary and migratable components. For example, a stationary electrolyte or electrolyte component can be optimized to support a reduction reaction, and a migratable electrolyte or electrolyte component can be optimized to support oxidation and charge transfers.

One electrolyte for meeting these requirements particularly for use with zinc anodes is a UV-curable cross-linked polymer mixture. An exemplary formulation of such a mixture is given as:

60.35 wt. % acryloyloxyethyltrimethylammonium chloride (as 72 wt. % soln. in water)

3.5 wt. % KCl 0.6 wt. % Darocur 1173

0.1 wt. % methylenebis(acrylamide)

An all organic (i.e., no water) UV-curable mixture can be generally formulated as follows:

15.5 g acrylic acid 12.5 g glycerin 0.5 g Darocur 1173

To this base, organic salts can be added to make the following curable electrolytes:

9.87% tetraethylammonium bromide (TEAB)

15.58% TEAB 19.72% TEAB 9.87% tetrabutylammonium bromide (TBAB)

12.98% TBAB

Figure 24:
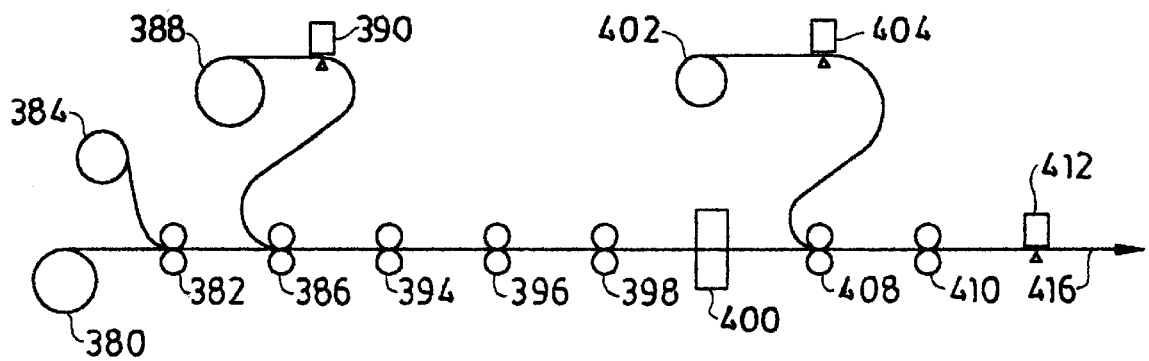
FIG. 24 is a schematic diagram of an in-line printing system for manufacture of a succession of display cells in label form.

Any of the display cells described here can be manufactured on an in-line press as illustrated in FIG. 24. A roll of pressure sensitive stock 380 with a release liner is unwound to serve as the base graphics layer printed at a printing station 382. A clear substrate 384 is unwound and laminated onto the base stock 380 at station 386. A roll of aluminum film 388 with a pressure-sensitive backing is die cut at station 390 and then laminated onto the clear base laminate at station 394. Another electrode is pattern printed at station 396, electrolyte is applied at station 398, and the electrolyte is cured or chilled at station 400. A pressure-sensitive top-sheet 402 on which adhesive has been zone coated is unrolled, die cut at station 404, and laminated onto the base layer at station 408. Further graphics are printed at station 410, the final shape of the display cells is die cut at station 412, and a succession of display cells in label form emerge at 416.

The thin metal films arranged as disappearing electrode layers in the preceding embodiments are all preferably formed by deposition onto non-conductive substrates and are distinguished from metal foils that are thinned from thicker metal forms. Deposition methods include vacuum evaporation, cathode sputtering, electroplating, and various chemical reactions in a controlled atmosphere or electrolyte. The deposited metal for the anode electrode is preferably zinc or aluminum; but other metals could also be used, such as copper, silver, or gold. The deposited material for the cathode electrode is preferably carbon, but thin films such as silver can also be used in combination with the aluminum film anode.

The display cells can be switched from a first state in which the thin metal film of the anode is opaque to a second state in which a predetermined area of the thin metal film becomes substantially transparent, but the display cells cannot be restored to the first state. The erosion that takes place in the thin metal films to reveal visual images is irreversible. The visual images remain permanently displayed through transparent portions of the non-conductive substrates that support the thin metal films.

All of the substrates, including the substrate that normally supports the thin metal film, the substrate that normally supports the visual image, and the pressure-sensitive adhesive-backed label stock are preferably supplied in rolls that can be unwound into an in-line press. All of the other layers, including the electrodes, the electrolyte, the dielectric, and the adhesives as well as the visual image, are preferably printed in patterns on one of the substrates by printing stations that are arranged along the press. Flexographic printing is preferred, but screen printing or other extrusion techniques may be required for printing the adhesives.

The thin metal films are preferably predeposited onto the top substrates in advance of any press operations. However, a thin metal film could also be transfer printed from a temporary carrier to the top substrate along the press, such as by hot or cold stamping. For example, a thin metal film could be transferred from the temporary carrier by cold stamping in a pattern that matches an adhesive pattern on the new substrate for shaping the electrodes.

Such in-line processing can be used to produce successions of electrochemical display cells in large volumes at low cost. Additional stations, such as die cutters, can be used to separate succeeding displays and to adapt the displays for their intended use as stand-alone display cells or as display cells incorporated within other products.

We claim:

1. An irreversible electrochemical display comprising:
   first and second electrodes interconnected by an electronically conductive pathway;
   an image obscured by the second electrode;
   electrolyte confined within an area out of contact with the second electrode; and
   a guided pathway through which the electrolyte can be moved into contact with a limited portion of the second electrode for completing an ionically conductive pathway between the first and second electrodes, in which the second electrode is progressively erodable along a common boundary with the electrolyte for revealing the image obscured by the second electrode.

2. The display of claim 1 in which the electrolyte is also confined within the area out of contact with the first electrode.

3. The display of claim 2 in which the guided pathway directs the electrolyte into contact with both the first and second electrodes.

4. The display of claim 1 in which the electrolyte is confined within the area in contact with the first electrode.

5. The display of claim 1 in which the electronically conductive pathway is formed by contact between the first and second electrodes.

6. The display of claim 1 in which the first and second electrodes overlap.

7. The display of claim 6 in which the overlap between electrodes completes a conductive pathway between the electrodes.

8. The display of claim 7 in which the first electrode overlaps the second electrode within an overlap area that extends beyond the common moving boundary with the electrolyte.

9. The display of claim 8 in which the overlap area extends in a direction approximately parallel to a direction of movement of the common boundary with the electrolyte to preserve the conductive pathway between the electrodes despite the progressive erosion of the second electrode.

10. The display of claim 1 in which the first and second electrodes extend in a common direction approximately parallel to a direction of movement of the common boundary with the electrolyte.

11. The display of claim 1 further comprising a barrier layer that separates the electrolyte from the second electrode.

12. The display of claim 11 in which the electrolyte layer overlaps the second electrode layer within the confined area that is out of contact with the second electrode.

13. The display of claim 1 in which the guided pathway penetrates the barrier layer to move the electrolyte into contact with the limited portion of the second electrode.

14. The display of claim 1 in which the electrolyte is a gelatinous material that is flowable through the guided pathway.

15. The display of claim 1 in which the first electrode is a cathode having a first electrode potential and the second electrode is an anode having a second different electrode potential.

16. The display of claim 15 in which the anode has a thickness less than one micron.

17. An irreversible electrochemical display comprising:
    first and second electrodes interconnectable by both ionically and electronically conductive pathways for supporting an electrochemical reaction that consumes the second electrode;
    the ionically conductive pathway including a flowable electrolyte that is initially maintained out of operative contact with an elongated portion of the second electrode;
    the elongated portion of the second electrode defining a path of migration for the flowable electrolyte;
    the first electrode also extending along the path of migration; and
    one of the conductive pathways being interruptable for controlling the start of the electrochemical reaction that progressively consumes the second electrode at a common boundary with the flowable electrolyte and produces an irreversible indication of change in the display.

18. The display of claim 17 in which the first electrode straddles the path of migration along the second electrode.

19. The display of claim 17 in which the first electrode overlaps the elongated portion of the second electrode in a direction approximately parallel to the path of migration.

20. The display of claim 19 in which substantially all of the second electrode overlaps the first electrode.

21. The display of claim 19 in which the electronically conductive pathway is completed between overlapping portions of the first and second electrodes that extend approximately parallel to the path of migration.

22. The display of claim 17 in which the flowable electrolyte overlaps the elongated portion of the second electrode.

23. The display of claim 22 in which a barrier layer isolates the flowable electrolyte from the elongated portion of the second electrode.

24. The display of claim 17 in which the second electrode has a thickness less than one micron.

25. The display of claim 17 in which the first and second electrodes have different electrode potentials.

26. The display of claim 25 in which completion of the conductive pathways supports a spontaneous electrochemical reaction between the electrodes.

27. The display of claim 17 in which the flowable electrolyte exhibits a surface tension that confines the electrolyte along the common boundary with the second electrode.

28. The display of claim 17 in which the first electrode includes discontinuous portions along the path of migration.

29. The display of claim 28 in which the discontinuous portions of the first electrode are connected by separate electronically conductive pathways to the second electrode.

30. The display of claim 17 in which the flowable electrolyte is temporarily confined within an area out of contact with the second electrode.

31. The display of claim 30 further comprising a guided pathway through which the flowable electrolyte can be moved into contact with a limited portion of the elongated portion of the second electrode.

32. The display of claim 17 further comprising an image obscured by the elongated portion of the second electrode.

33. The display of claim 32 in which the electrochemical reaction progressively reveals the underlying image obscured by the elongated portion of the second electrode along the path of migration.

34. An irreversible electrochemical display comprising:
    two electrodes having different electrode potentials and a flowable electrolyte supported between two substrates;
    a first of the substrates including a transparent window for viewing a second of the two electrodes;
    a guided pathway between the two substrates for directing the flowable electrolyte along a path of migration that includes the second substrate; and the flowable electrolyte being engageable with the second electrode along a common boundary that progressively advances along the guided pathway for producing a change viewable through the transparent window.

35. The display of claim 34 in which the flowable electrolyte is confined within an area out of contact with at least a portion of the second electrode that extends along the path of migration.

36. The display of claim 35 in which the flowable electrolyte contacts the first electrode within the confined area.

37. The display of claim 35 in which the flowable electrolyte is confined out of contact with both electrodes within the confined area.

38. The display of claim 35 in which a pocket is formed between the two substrates for confining the flowable electrolyte.

39. The display of claim 38 in which the pocket is compressible for moving the flowable electrolyte out of the pocket along the guided pathway.

40. The display of claim 34 in which the guided pathway directs the flowable electrolyte to complete an ionically conductive pathway between the first and second electrodes.

41. The display of claim 40 in which the flowable electrolyte overlaps the second electrode.

42. The display of claim 41 in which a barrier separates the flowable electrolyte from the overlapped portion of the second electrode.

43. The display of claim 34 in which an electronically conductive pathway is formed by overlapping electronic contact between the first and second electrodes.

44. The display of claim 43 in which the first electrode extends along the path of migration for completing the electronically conductive pathway between electrodes beyond the advancing boundary between the flowable electrolyte and the second electrode.

45. The display of claim 44 in which the first electrode straddles the path of migration along the second electrode.

46. The display of claim 44 in which substantially all of the first electrode overlaps the second electrode.

47. The display of claim 34 in which the guided pathway includes two smooth surfaces between which the second electrode is confined.

48. The display of claim 34 in which the flowable electrolyte is transparent.

49. A method of producing an irreversible change in an electrochemical display comprising:

electronically interconnecting first and second electrodes having different electrode potentials;

temporarily confining a flowable electrolyte out of contact with an elongated portion of the second electrode;

initiating an electrochemical reaction that progressively erodes the elongated portion of the second electrode at a common boundary with the flowable electrolyte without correspondingly adding to an area occupied by the first electrode; and revealing an image behind the advancing common boundary of the flowable electrolyte and the second electrode.

50. The method of claim 49 including a further step of extending the flowable electrolyte from a position out of contact with the second electrode into a position in contact with the second electrode for completing an ionically conductive pathway between the first and second electrodes.

51. The method of claim 49 including a further step of extending the flowable electrolyte from a position in contact with only the first electrode of the first and second electrodes to a position in contact with both the first and second electrodes for completing an ionically conductive pathway between the first and second electrodes.

52. The method of claim 49 including a further step of extending the flowable electrolyte from a position out of contact with both the first and second electrodes into a position in contact with both the first and second electrodes for completing an ionically conductive pathway between the first and second electrodes.

53. The method of claim 50 in which the step of extending includes directing the flowable electrolyte along a guided pathway that includes the elongated portion of the second electrode.

54. The method of claim 49 in which the step of temporarily confining includes confining the flowable electrolyte in a pocket formed between two substrates.

55. The method of claim 54 including a further step of squeezing the flowable electrolyte out of the pocket into contact with the elongated portion of the second electrode.

56. The method of claim 49 in which the step of electronically interconnecting includes overlapping the first and second electrodes along the extended portion of the second electrode.

57. The method of claim 49 including a further step of orienting the first and second electrodes in a common direction along the elongated portion of the second electrode.

* * * * *